(No Model.) 2 Sheets—Sheet 1.
J. BLUMER.
CORRUGATING AND CUTTING TOOL.
No. 570,218. Patented Oct. 27, 1896.
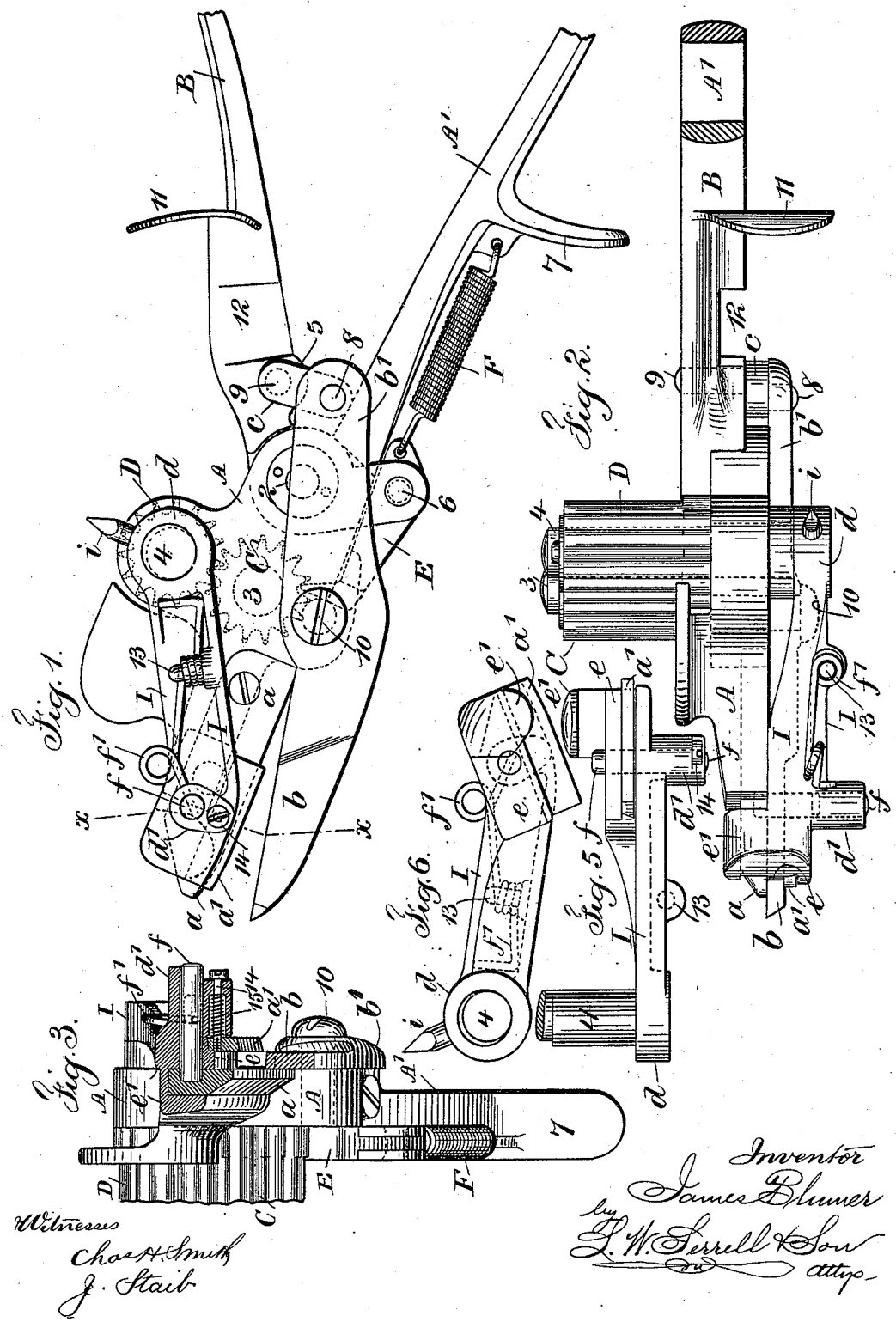
Witnesses
Chas. H. Smith
J. Staib
Inventor
James Blumer
by L. W. Serrell & Son
attys.
THE NORRIS PETERS CO., PHOTO-LITHO., WASHINGTON, D. C.

(No Model.) 2 Sheets—Sheet 2.
J. BLUMER.
CORRUGATING AND CUTTING TOOL.
No. 570,218. Patented Oct. 27, 1896.
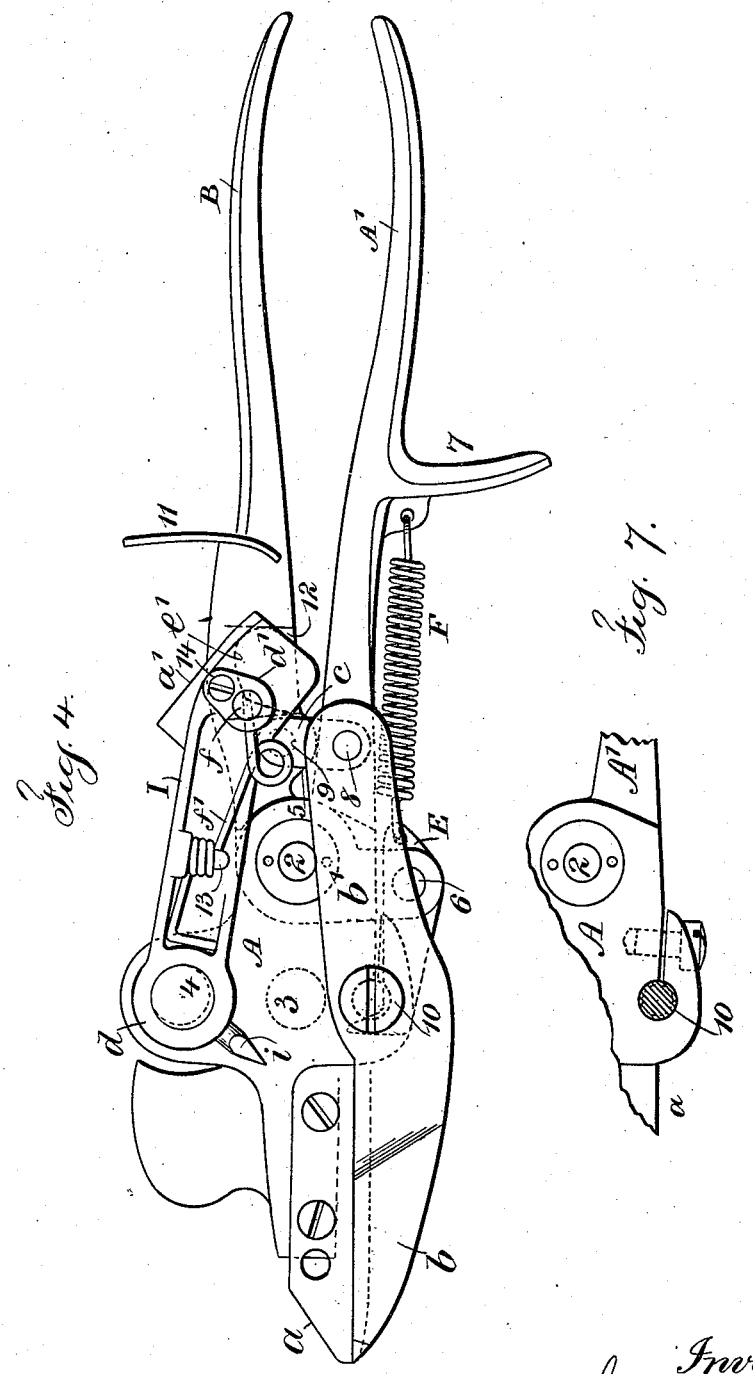
Witnesses
Chas. H. Smith
J. Staib
Inventor
James Blumer
by L. W. Serrell & Son
Attys

UNITED STATES PATENT OFFICE.

JAMES BLUMER, OF BROOKLYN, NEW YORK, ASSIGNOR TO THE BLUMER, DOSCHER MANUFACTURING COMPANY, OF SAME PLACE.

CORRUGATING AND CUTTING TOOL.

SPECIFICATION forming part of Letters Patent No. 570,218, dated October 27, 1896.

Application filed March 16, 1896. Serial No. 583,322. (No model.)

*To all whom it may concern:*

Be it known that I, JAMES BLUMER, a citizen of the United States, residing at Brooklyn, in the county of Kings and State of New York, have invented a new and useful Improvement in Corrugating and Cutting Tools, of which the following is a specification.

My present invention is designed as an improvement upon the device secured to me by Letters Patent dated July 9, 1895, No. 542,435. This patent relates to an improved device for corrugating and cutting sheet metal, notably for cutting the end of a length of stovepipe and corrugating the same so as to adapt the one end to slip freely into the end of the adjacent length of pipe.

In fitting sheet-metal pipes together it is often necessary to cut a length of pipe into two pieces, and the implement in said patent was not adapted to this object because the shear could only be used upon the end of the pipe where the portion cut off could bend away from the pipe under the action of the upwardly-moving blade that is within the pipe.

In the present invention I employ a shear one blade of which has parallel sides forming two cutting edges, and I use a movable cutter that can be swung back out of the way of the shears when used in the ordinary manner and when swung over into position for use said cutter is hooked upon and bolted to the ordinary blade and acts with the parallel-sided blade to cut out a strip of sheet metal with parallel edges. By this improvement I am able to separate a pipe into two pieces by cutting out a narrow strip of metal, the ordinary blade and the movable cutter resting on the outside of the pipe and the parallel-sided blade being thrust through a hole punched in the pipe and acting to cut such strip outwardly. With this tool I am also able to more effectively cut across a sheet of metal. I combine this peculiar shear with the tool shown in said patent in such a manner as to use the arm that carries the movable cutter for bringing the corrugating-rolls into action.

In the drawings, Figure 1 is a side elevation representing my improved corrugating and cutting tool. Fig. 2 is a plan of the same. Fig. 3 is an end view and cross-section at *x x* of Fig. 1. Fig. 4 is a side elevation of my improved corrugating and cutting tool in a closed position adapted to be carried about by the workman. Fig. 5 is an inverted plan of the arm and the cutter carried thereby in a position the reverse of that shown in Figs. 1 and 2. Fig. 6 is a side elevation of the arm shown in Fig. 5, and Fig. 7 is a section and elevation showing the means for holding to the stock of the tool the pivot of the cutting-blade.

As in my aforesaid patent, the stock A is provided with a handle A', and a second handle B is pivoted at 2 to the stock A, and the corrugating-rolls C and D are supported upon the arbors 3 and 4, that extend out from the stock A. These corrugating-rolls C and D, as usual, work together similar to gears, their diameters being reduced except at the inner ends adjacent to the stock A, the outer portions of said rolls performing the operation of corrugating the sheet metal and the inner ends acting as teeth that remain in gear without the risk of being separated by the sheet of material that is introduced and is being corrugated.

The handle B has a projection to which the pawl E is pivoted at 6, and this pawl engages the teeth of the corrugating-roll C. The stud 7 projects from the handle A', and the ends of the contractile spring F are connected to eyes upon said stud and pawl. The gripping action of the hand in bringing the handles A' and B together moves the pawl E forward, and the corrugating-rolls C D are rotated and the contractile spring F strained, and the stop-block 5 on handle B regulates the distance of the handles from each other when closed. The release of the handles permits the spring F to contract and open the handles and return the pawl to a normal position for repeating the operation. The stock A is continued at its forward end and is notched for the reception of a stationary cutting-blade *a*, connected to the stock by screws, and said stock receives the pivot 10 of the moving cutting-blade *b*, said pivot being secured by a clamping-screw, as shown in Fig. 7. This moving cutting-blade *b* has parallel sides forming two cutting edges and an integral arm *b'* at the other side of the pivot 10, and a link c is connected by pivots 8 and 9 to the end of this arm b' and to the moving handle B, the operation of which, through the medium of the link c, causes the edge of the cutting-blade to move over the cutting edge of the stationary blade, as in my aforesaid patent. The corrugating-roll D is upon an eccentric arbor 4, which projects through the stock A, and an arm I is connected to this eccentric arbor, and the movement of said arm, as it is swung from one to the other of its positions, operates the eccentric arbor to move the roll D nearer to or farther from the roll C to cause said rolls to be in engagement with each other or slightly separated.

The arm I is provided with integral hubs $d$ $d'$, the hub $d$ surrounding the eccentric arbor 4 and being provided with a stud $i$, having a penetrating point, and the hub $d'$ is mortised and a bolt $f$ passes through said hub $d'$, and the side of the arm I is recessed and provided with a stud 13. The wire spring $f'$ is provided with a coiled portion surrounding the stud 13, with a bent end seated in the recess of the arm and at the other with an eye and an end passing through the mortise of the hub $d'$ and into an opening in the bolt $f$. The action of this spring is to press the bolt $f$ toward the stock A, and the bolt is moved longitudinally in its hub by the action of the finger against the eye of said spring. The arm I is also provided with a rib $e$, and a yielding cutting-blade $a'$ is seated between the rib $e$ and the surface of said arm, and said arm is also provided with a hooked end $e'$. The yielding cutting-blade $a'$ has a screw-pin 14, passing through the arm I and through a recess in the hub $d'$ and screwing into said blade $a'$, and in said recess is a helical spring 15, around the screw-pin, and said spring 15 bears between the arm I and the surface of the blade $a'$ to hold said blade with more or less force against the rib $e$.

In the position shown in Figs. 1 to 3 the arm I is swung forward, bringing the corrugating-rolls into engagement with each other, and the stationary blade $a$ is received between the hooked end $e'$ and the rib $e$ of said arm, and the bolt $f$ passes into an opening in said jaw $a$ to lock the arm in position.

Both edges of the blade $b$ are made as cutting edges, the one edge in the operation of the parts moving over the cutting edge of the blade $a$ and the other moving over the cutting edge of the yielding blade $a'$, so as to remove from the metal a parallel-edged strip of a width corresponding to the with of the cutting-blade $b$, and the object of the yielding blade $a'$ is to prevent a binding of the parts as the metal strip is cut which will make it difficult to separate the handles after the cutter $b$ passes in between the cutters $a$ $a'$.

It will be noticed from the elevation in Fig. 1 that the edge of the yielding cutting-blade $a'$ projects beyond the edge of the blade $a$. Consequently, the cutting of the metal strip between the edges of the blades $a'$ and $b$ will be slightly in advance of the cutting between the blades $a$ and $b$, so that longitudinally-opposite edges of the strip are not cut simultaneously, but the one in advance of the other, thus forming a cleaner cut and reducing the liability of a binding together of the parts in cutting the tongue of metal from the sheet or stovepipe.

The moving handle B is made with a guard 11 and with a surface-notch 12, and in the position of the parts shown in Fig. 4 the arm I is swung back, so that the hooked end $e'$ is received in said notch 12, and in this position the handles are locked together for the convenience of the workman in carrying the tool about.

In the operation of this corrugating and cutting tool the penetrating point of the stud $i$ is forced through the sheet metal or pipe, making a hole in which the point of the cutting-blade $b$ is inserted to start the cutting operation and from which point the cutting-tool is advanced progressively with the movement of the blades in separating the metal, the blades $a$ $a'$ being upon the outside of the pipe and the blade $b$ inside the pipe. This corrugating and cutting tool is exceedingly convenient because combining in one instrument means for cutting sheet metal and for corrugating the same, and it avoids the necessity of carrying and handling two separate tools, the one for cutting and the other for corrugating the metal.

I claim as my invention—

1. The combination in a shear having two pivotally-connected handles and cutting-blades, one of said blades being of ordinary character, and the other parallel-sided with two cutting edges, of a third cutting-blade and means for connecting the same directly with and adjacent and parallel to the cutting-blade of ordinary character so that the parallel-sided blade can cut out a strip, substantially as set forth.

2. The combination in a shear having handles and two blades, one of which is of ordinary character and the other is parallel-sided forming two cutting edges, of a cutter and a pivoted arm to which such cutter is connected, and means for holding the cutter in position on the ordinary blade when in use, substantially as set forth.

3. The combination in a shear having handles and two blades, one of which is of ordinary character and the other is parallel-sided forming two cutting edges, of a cutter and a pivoted arm to which such cutter is connected, and a hook and bolt for holding the cutter in position on the ordinary blade when in use, substantially as specified.

4. The combination in a shear having handles and two blades, one of which is of ordinary character and the other is parallel-sided forming two cutting edges, of a cutter and a pivoted arm to which such cutter is connected, a hook and bolt for holding the cutter in position on the ordinary blade when in use, and a spring on the arm to actuate the bolt, substantially as specified.

5. The combination in a shear having handles and two blades, one of which is of ordinary character and the other is parallel-sided forming two cutting edges, of a cutter and a pivoted arm to which such cutter is connected, and means for holding the cutter in position on the ordinary blade when in use, a stud connected with the arm and passing through the stock of the shear and forming an arbor, a corrugating-roll on such arbor and a second corrugating-roll and an arbor therefor, and means for rotating the corrugating-rolls, substantially as specified.

6. The combination in a shear having handles and two blades, one of which is of ordinary character and the other is parallel-sided forming two cutting edges, of a cutter and a pivoted arm to which such cutter is connected, and means for holding the cutter in position on the ordinary blade when in use, a stud connected with the arm and passing through the stock of the shear and forming an arbor having an eccentric portion, a corrugating-roll on such arbor and a second corrugating-roll and an arbor therefor, and means for rotating the corrugating-rolls whereby one corrugating-roll is moved toward the other by swinging the cutter and its arm from one position to the other, substantially as specified.

7. The combination with the stock, the handles, the corrugating-rolls and their arbors, of a stationary cutting-blade upon the stock, a moving cutting-blade having parallel sides forming two cutting edges and an arm integral therewith and pivoted to the stock and a connection therefrom to the moving handle, an arm pivoted to the eccentric arbor of one corrugating-roll and having a hub surrounding said arbor, and a stud $i$ secured in and projecting from said hub and having a penetrating-point to puncture the metal for the introduction of the point of the parallel-sided cutting-blade, substantially as set forth.

8. The combination with the stock, the handles, the corrugating-rolls and their arbors, of a stationary cutting-blade upon the stock, the moving blade having parallel sides forming two cutting edges and an integral arm pivoted to the stock and a connection therefrom to the moving handle, an arm pivoted to the eccentric arbor of one corrugating-roll, a hub $d'$ formed integral with the said arm and having a recess, the yielding cutting-blade $a'$, a screw-pin 14 passing through the arm and said recess, and screwing into the blade $a'$, and a helical spring 15 within said recess and around the screw-pin 14 and bearing against said arm and yielding cutting-blade to apply the desired pressure thereto, as and for the purposes set forth.

Signed by me this 3d day of March, A. D. 1896.

JAMES BLUMER.

Witnesses:
 GEO. T. PINCKNEY,
 HAROLD SERRELL.